(12) United States Patent
Muroyama et al.

(10) Patent No.: US 10,977,107 B2
(45) Date of Patent: Apr. 13, 2021

(54) APPARATUS AND METHOD TO CONTROL A STORAGE DEVICE

(71) Applicant: FUJITSU LIMITED, Kawasaki (JP)

(72) Inventors: Tomohiko Muroyama, Kawasaki (JP); Masahiro Yoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 182 days.

(21) Appl. No.: 15/911,247

(22) Filed: Mar. 5, 2018

(65) Prior Publication Data

US 2018/0307554 A1 Oct. 25, 2018

(30) Foreign Application Priority Data

Apr. 20, 2017 (JP) .............................. JP2017-083710

(51) Int. Cl.
*G06F 11/07* (2006.01)
*G06F 8/65* (2018.01)
*G06F 11/14* (2006.01)

(52) U.S. Cl.
CPC ............ *G06F 11/0772* (2013.01); *G06F 8/65* (2013.01); *G06F 11/0727* (2013.01); *G06F 11/0751* (2013.01); *G06F 11/0793* (2013.01); *G06F 11/1433* (2013.01)

(58) Field of Classification Search
CPC .... G06F 8/65; G06F 11/0727; G06F 11/0793; G06F 11/1433; H04L 41/082
See application file for complete search history.

(56) References Cited

U.S. PATENT DOCUMENTS

| | | | |
|---|---|---|---|
| 2009/0077280 A1* | 3/2009 | Anderson | H04L 41/04 710/62 |
| 2012/0084508 A1* | 4/2012 | Suzuki | G06F 11/2089 711/114 |
| 2016/0062761 A1 | 3/2016 | Muroyama et al. | |

FOREIGN PATENT DOCUMENTS

| | | |
|---|---|---|
| JP | 2012-079175 | 4/2012 |
| JP | 2016-053855 | 4/2016 |

* cited by examiner

*Primary Examiner* — Jigar P Patel
(74) *Attorney, Agent, or Firm* — Fujitsu Patent Center

(57) ABSTRACT

During degeneration processing in which a first electronic device is degenerated based on an abnormality which has occurred in the first electronic device among the plurality of electronic devices after a new firmware used for switching of firmware of the electronic devices is stored in the first memories of the electronic devices, a storage control device confirms whether switching to new firmware has been completed in a second electronic device among the plurality of electronic devices, where the second electronic device is on a connection route coupling the first electronic device which is a firmware switching target and the storage control device. The storage device inhibits incorporation of the second electronic device as a usable device in a case where switching to the new firmware has not been completed in the second electronic device.

8 Claims, 13 Drawing Sheets

FIG. 3

|  | Byte0 | Byte1 | Byte2 | Byte3 |
|---|---|---|---|---|
| 0x00 | CONTROL CM ID | SWITCHING DESTINATION OPERATION SURFACE | FIRST HALF SYSTEM (0 or 1) | SECOND HALF SYSTEM (0 or 1) |
| 0x04 | ERROR INFORMATION ||||
| 0x08 | APPLIED FIRMWARE INFORMATION (FIRMWARE VERSION NUMBER INFORMATION) ||||
| 0x0C |  ||||
| 0x10 | OVERALL STATUS (STATUS OF WHOLE DEVICE) ||||
| 0x14 | NUMBER OF TARGET MODULES (NUMBER OF COMPONENTS WHICH ARE FIRMWARE REVISION TARGETS) ||||
| 0x18 | COMPONENT PROGRESS STATUS INFORMATION [0] ||||
| 0x1C |  ||||
| 0x20 |  ||||
| 0x24 | COMPONENT PROGRESS STATUS INFORMATION [1] ||||
| 0x28 |  ||||
| 0x2C |  ||||
| : | : ||||
| 0xYY | COMPONENT PROGRESS STATUS INFORMATION [n−1] ||||
| : |  ||||
| : |  ||||

|  | Byte0 | Byte1 | Byte2 | Byte3 |
|---|---|---|---|---|
| 0x00 | Version | | Level | |
| 0x04 | Suffix | | | |

FIG. 5

|  | Byte0 | Byte1 | Byte2 | Byte3 |
|---|---|---|---|---|
| 0x00 | COMPONENT ID | | | |
| 0x04 | COMPONENT SUB INFORMATION | | FIRMWARE TYPE | Reserve |
| 0x08 | PROGRESS INFORMATION | | | |

FIG. 6

|  | Byte0 | Byte1 | Byte2 | Byte3 |
|---|---|---|---|---|
| 0x00 | OPERATION SURFACE | NEXT OPERATION SURFACE | Reserve | |
| 0x04 | Reserve | | | |
| 0x08 | | | | |
| 0x0C | | | | |
| 0xXX : 0xYY | VERSION NUMBER INFORMATION OF WHOLE FIRMWARE [0] | | | |
| 0xZZ : | VERSION NUMBER INFORMATION OF WHOLE FIRMWARE [1] | | | |

FIG. 7

|  | Byte0 | Byte1 | Byte2 | Byte3 |
|---|---|---|---|---|
| 0x00 | VALID FLAG | Reserve | | |
| 0x04 | OVERALL VERSION NUMBER (FIRMWARE VERSION NUMBER INFORMATION) | | | |
| 0x08 | | | | |
| 0x0C | DATE | | | |
| 0x10 | | | | |
| 0x14 | COMPONENT VERSION NUMBER [0] (FIRMWARE VERSION NUMBER INFORMATION) | | | |
| 0x18 | | | | |
| 0x1C | DATE | | | |
| 0x20 | | | | |
| : | : | | | |
|  | COMPONENT VERSION NUMBER [n−1] (FIRMWARE VERSION NUMBER INFORMATION) | | | |
|  | DATE | | | |

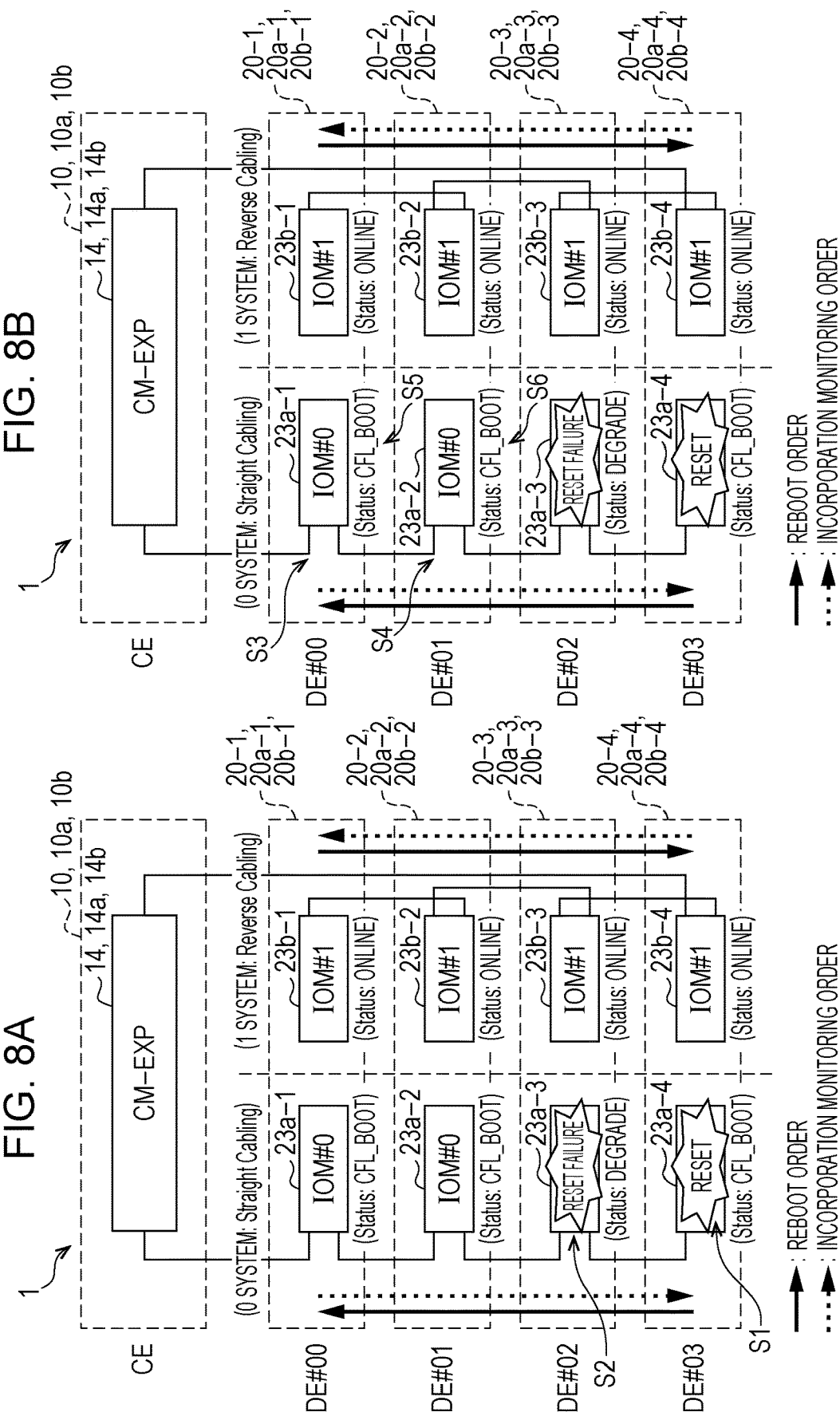

FIG. 13
RELATED ART

|  | FIRST HALF | | SECOND HALF | |
|---|---|---|---|---|
|  | 1 | 2 | 3 | 4 |
| IOM #1 SYSTEM, FEM #1 SYSTEM (ONLY HIGH DENSITY DE) | O | | | |
| CM#1(CM BIOS, IA, CA, CM EXP) | | O | | |
| CM#0(CM BIOS, IA, CA, CM EXP) | | | O | |
| IOM #0 SYSTEM, FEM #0 SYSTEM (ONLY HIGH DENSITY DE) | | | | O |

FIG. 14
RELATED ART

|  | FIRST HALF | | | SECOND HALF | | |
|---|---|---|---|---|---|---|
|  | 1 | 2 | 3 | 4 | 5 | 6 |
| SVC#1 | O | | | | | |
| IOM #1 SYSTEM, FEM #1 SYSTEM (ONLY HIGH DENSITY DE) | | O | | | | |
| CEx-CM #1 SYSTEM (CM BIOS, IA, CA, CM EXP) | | | O | | | |
| CEx-CM #0 SYSTEM (CM BIOS, IA, CA, CM EXP) | | | | O | | |
| IOM #0 SYSTEM, FEM #0 SYSTEM (ONLY HIGH DENSITY DE) | | | | | O | |
| SVC#0 | | | | | | O |

APPARATUS AND METHOD TO CONTROL A STORAGE DEVICE

CROSS-REFERENCE TO RELATED APPLICATION

This application is based upon and claims the benefit of priority of the prior Japanese Patent Application No. 2017-83710, filed on Apr. 20, 2017, the entire contents of which are incorporated herein by reference.

FIELD

The embodiment discussed herein is related to apparatus and method to control a storage device.

BACKGROUND

A storage apparatus is provided with a large number of modules (electronic components or electronic devices). For example, in a device enclosure which stores a storage device such as a hard disk drive (HDD) and a solid state drive (SSD), modules such as an input output module (IOM) and a fan expander module (FEM) are provided. In addition, with recent increase in capacity and densification of storage, the number of modules mounted in a storage apparatus is also increasing.

In each of these modules, firmware is executed. It is requested to apply the latest firmware to a module in order to stabilize a storage apparatus, improve efficiency of an operation, and realize use of new functions.

In addition, it is desirable to apply firmware to all mounted modules while maintaining an operation state of the device. Therefore, a function for applying firmware to a module is very important.

As described above, a storage apparatus includes a plurality of modules and each of the modules operates with independent firmware. In general, each module has two areas which are an operation surface side area and a non-operation surface side area as storage area into which firmware is written.

When updating firmware (hereinafter referred to as new firmware) is applied to a module, the new firmware is first written in the non-operation surface side area. Then, after the non-operation surface side area in which the new firmware is written is switched to the operation surface side area, the module is reset (rebooted or restarted) and activated with the new firmware written in the operation surface side area. Hereinafter, applying new firmware is sometimes referred to as revision of firmware or simply revision.

Processing for switching firmware while maintaining a system in an operation state is sometimes referred to as active firmware application processing. In the active firmware application processing, a plurality of modules are divided into two systems of module groups which are a first-half module group and a second-half module group and firmware revision is performed one group after another with an on-line state maintained.

FIGS. 13 and 14 are diagrams illustrating active firmware application processing of related art, respectively. FIG. 13 is a diagram illustrating active firmware application processing in a low-end model storage apparatus and FIG. 14 is a diagram illustrating active firmware application processing in a high-end model storage apparatus.

The active firmware application processing starts from a state in which new firmware is preliminarily written in a storage area (non-operation surface side area) such as a memory provided in a module. The active firmware application processing is executed in two stages of the first half and the second half after the writing of the new firmware in the non-operation surface side area.

In the low-end model storage apparatus illustrated in FIG. 13, after revision is performed in modules of an input output module (IOM) #1 system and a fan expander module (FEM) #1 system, revision is performed in each module provided to a controller module (CM) #1, in the first half. Then, in the second half, after revision is performed in each module provided to a CM #0, revision is performed in modules of an IOM #0 system and an FEM #0 system.

In the high-end model storage apparatus illustrated in FIG. 14, after revision is performed in a service controller (SVC) #1, revision is performed in modules of an IOM #1 system and an FEM #1 system, and then revision is performed in each module provided to a CEx-CM #1, in the first half.

In the second half, after revision is performed in each module provided to a CEx-CM #0, revision is performed in modules of an IOM #0 system and an FEM #0 system, and then, revision is performed in an SVC #0.

FIG. 15 is a diagram illustrating a procedure of switching firmware of an IOM in a storage apparatus of related art.

A storage apparatus 500 illustrated in FIG. 15 includes a controller enclosure (CE) 510 and a plurality of device enclosures (DEs) 520-1 to 520-4. The DEs 520-1, 520-2, 520-3, and 520-4 are sometimes referred to as the DEs #00, #01, #02, and #03, respectively.

The CE 510 is provided with a controller module-expander (CM-EXP) 511 and two duplicated controller modules (CMs) which are not illustrated. The CMs provided to the CE 510 control data access to storage devices which are stored in the DEs 520-1 to 520-4 and are not illustrated.

To the CM-EXP 511, the DEs 520-1 to 520-4 are cascade-connected.

The DE 520-1 includes IOMs 521-1 and 521-2 and thus, the IOMs 521-1 and 521-2 are duplicated in the DE 520-1.

In a similar manner, the DE 520-2 includes IOMs 521-3 and 521-4, the DE 520-3 includes IOMs 521-5 and 521-6, and the DE 520-4 includes IOMs 521-7 and 521-8.

Hereinafter, the IOM 521-1 is sometimes referred to as the DE #00-IOM #0. In a similar manner, the IOM 521-2 is sometimes referred to as the DE #00-IOM #1, the IOM 521-3 is sometimes referred to as the DE #01-IOM #0, and the IOM 521-4 is sometimes referred to as the DE #01-IOM #1. Further, the IOM 521-5 is sometimes referred to as the DE #02-IOM #0, the IOM 521-6 is sometimes referred to as the DE #02-IOM #1, the IOM 521-7 is sometimes referred to as the DE #03-IOM #0, and the IOM 521-8 is sometimes referred to as the DE #03-IOM #1.

Hereinafter, as the reference numerals denoting IOMs, the reference numerals 521-1 to 521-8 are used when one of a plurality of IOMs has to be specified, but the reference numeral 521 is used when an arbitrary IOM is denoted. Further, as the reference numerals denoting DEs, the reference numerals 520-1 to 520-4 are used when one of a plurality of DEs has to be specified, but the reference numeral 520 is used when an arbitrary DE is denoted.

To the CM-EXP 511, the IOM 521-1, the IOM 521-3, the IOM 521-5, and the IOM 521-7 are cascade-connected in this order. A route through which the IOM 521-1, the IOM 521-3, the IOM 521-5, and the IOM 521-7 are connected from the CM-EXP 511 is sometimes referred to as a 0 system route. Each IOM 521 connected to the 0 system route is managed by one CM (0 system CM) out of the two CMs provided to the CE 510.

In addition, the IOM 521-8, the IOM 521-6, the IOM 521-4, and the IOM 521-2 are cascade-connected to the CM-EXP 511 in this order. A route through which the IOM 521-8, the IOM 521-6, the IOM 521-4, and the IOM 521-2 are connected from the CM-EXP 511 is sometimes referred to as a 1 system route. Each IOM 521 connected to the 1 system route is managed by the other CM (1 system CM), which is different from the 0 system CM, between the two CMs provided to the CE 510. Also, the 1 system route is reverse cabled with respect to the 0 system route.

In the storage apparatus 500, the IOMs 521 on the 1 system route belong to the first-half module group and the IOMs 521 on the 0 system route belong to the second-half module group, and similarly to the duplicated CM, firmware is switched one system after another for the first half and the second half.

As described above, in the case where a plurality of DEs 520 are mounted on the storage apparatus 500, a plurality of IOMs 521 are connected to the CM-EXP 511 in a cascade state for each system. Therefore, if reboot is performed from the IOM 521 which is positioned closest to (on a root of) the CM-EXP 511, it becomes impossible to control the IOMs 521 positioned farther from the CM-EXP 511.

In the example illustrated in FIG. 15, the IOM 521-1 on the 0 system route and the IOM 521-8 on the 1 system route correspond to the IOMs 521 closest to the CM-EXP 511. If these IOM 521-1 and IOM 521-8 are rebooted, it is impossible to control other IOMs 521 on the respective same system routes during this reboot processing.

Therefore, reboot is performed in order from the IOM 521 at the end farthest from the CM-EXP 511, and incorporation monitoring is sequentially performed from the IOM 521 positioned on the root.

In switching of firmware, in order to retard the IOM 521, which is in the switching operation, from being used as an input/output (I/O) route, a special status indicating that firmware switching is being performed is set for the IOM 521, which is a switching target, in information for managing device configuration (device configuration management information), and incorporation processing into the system is performed while reboot is performed in sequence.

Here, it is possible to exchange each module mounted on the storage apparatus 500 while a system operation is continued at the time of occurrence of a failure or the like (active exchange), and it is also possible to perform active exchange with respect to the IOM 521. In the CM of the storage apparatus 500, in order to detect extraction of the IOM 521, monitoring processing for monitoring a state of the IOM 521 is performed by making a communication to inquire the state (IOM state) of the IOM 521 at regular time intervals.

Further, in each DE 520, each IOM 521 has a function by which a first IOM 521 monitors a second IOM 521, which belongs to the other system, forms a pair with the first IOM 521, and is provided in the same DE 520 as the first IOM 521, and responds the state of the second IOM 521 of the pair with respect to an inquiry about the IOM state from the CM.

Japanese Laid-open Patent Publication No. 2012-79175 and Japanese Laid-open Patent Publication No. 2016-53855 are examples of related art.

SUMMARY

According to an aspect of the invention, during degeneration processing in which a first electronic device is degenerated based on an abnormality which has occurred in the first electronic device among the plurality of electronic devices after a new firmware used for switching of firmware of the electronic devices is stored in the first memories of the electronic devices, a storage control device confirms whether switching to new firmware has been completed in a second electronic device among the plurality of electronic devices, the second electronic device being on a connection route coupling the first electronic device which is a firmware switching target and the storage control device, and inhibits incorporation of the second electronic device as a usable device in a case where switching to the new firmware has not been completed in the second electronic device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating the configuration of firmware switching progress information in the storage apparatus as an example of the embodiment;

FIG. 4 is a diagram illustrating a configuration example of firmware version number information in the storage apparatus as an example of the embodiment;

FIG. 5 is a diagram illustrating a configuration example of component progress status information in the storage apparatus as an example of the embodiment;

FIG. 6 is a diagram illustrating firmware version number management information included in device configuration information in the storage apparatus as an example of the embodiment;

FIG. 7 is a diagram illustrating version number information of whole firmware in the storage apparatus as an example of the embodiment;

FIGS. 8A and 8B are diagrams illustrating a process of firmware switching processing in the storage apparatus as an example of the embodiment;

FIG. 13 is a diagram illustrating active firmware application processing of related art;

FIG. 14 is a diagram illustrating active firmware application processing of related art;

DESCRIPTION OF EMBODIMENT

There is a case where each module provided to the storage apparatus 500 performs reset (reboot or restart) in order to recover from a trouble which has temporarily occurred. Such temporary reset may occur irrespective of whether or not firmware is being switched.

In the case where the IOM 521 has reset due to a temporary trouble during firmware switching, the IOM 521 which has reset is activated with new firmware which has been written in the storage area. In the IOM 521 after activating with the new firmware, it is impossible to read the new firmware from the storage area. Therefore, in response to a firmware switching instruction subsequently issued by a firmware management unit of the CM, the IOM 521 makes an abnormal response.

In the case where an abnormal response is made in the firmware switching processing, the firmware management unit determines that a module which has made the abnormal response is an abnormal component and performs degeneration processing for separating this module from a device.

Figure 16A:
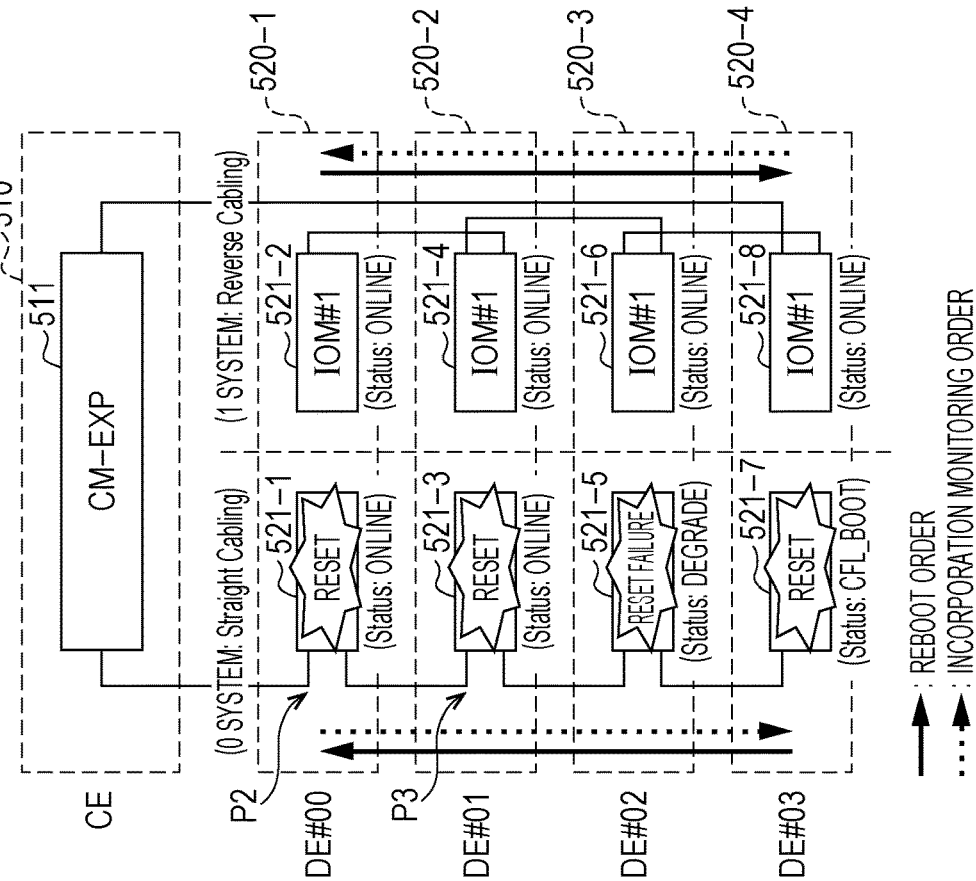
FIGS. 16A and 16B are diagrams illustrating a process of firmware switching processing in a storage system of related art.
Figure 16B:
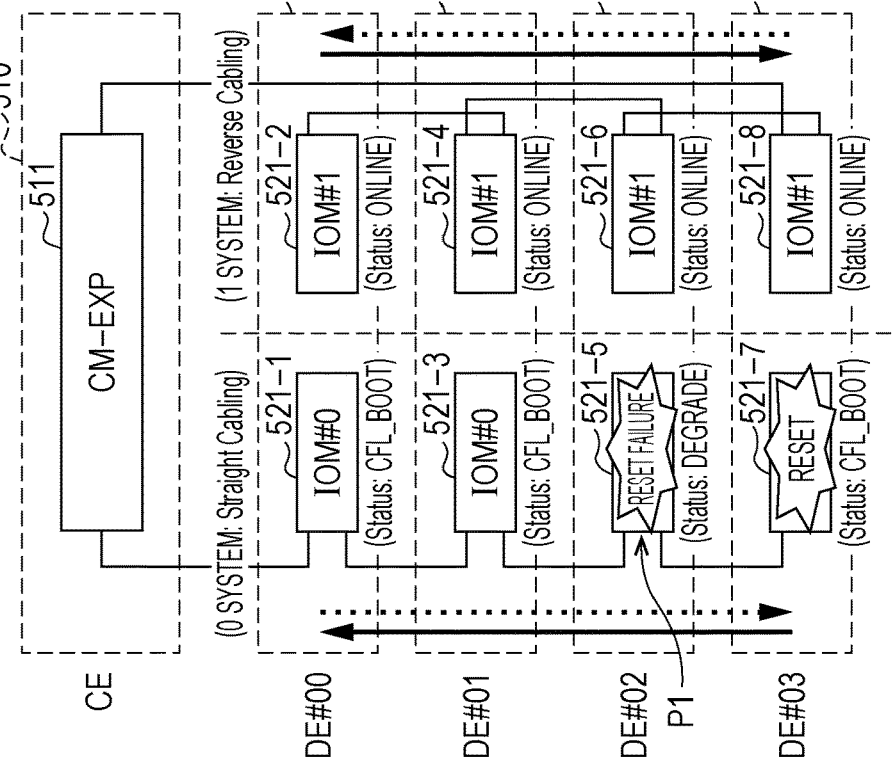

FIGS. 16A and 16B are diagrams illustrating a process of firmware switching processing in a storage apparatus of related art. After the state of FIG. 16A, the state shifts to the state of FIG. 16B.

In FIG. 16A, "CFL_BOOT" is set as a special status, which indicates that firmware is being switched, for the IOMs 521-1, 521-3, and 521-7 on the 0 system route. Also, "ONLINE" is set as a status, which indicates that a normal operation is being performed, for the IOMs 521-2, 521-4, 521-6, and 521-8 on the 1 system route.

Further, in the storage apparatus 500 illustrated in FIG. 16A, the IOMs 521-7, 521-5, 521-3, and 521-1 are reset (rebooted) in this order on the 0 system route.

In the state illustrated in FIG. 16A, after the IOM 521-7 is reset, reset of the IOM 521-5 is failed and "DEGRADE" indicating a degenerated state is set for the IOM 521-5 (see an arrow P1).

In the case where IOM incorporation processing in IOM reset processing in the firmware switching processing and IOM incorporation processing by IOM maintenance are common processing, the CM recognizes that the IOM 521, which has not been reset, is usable in the degeneration processing from a device of the module concerned.

As a result, the CM changes the status of the module concerned from the status (CFL_BOOT) indicating that firmware is being switched to the status (ONLINE) indicating that a normal operation is being performed, in the device configuration management information, and incorporates the module as a normal module. That is, the status (CFL_BOOT) indicating that firmware is being switched is canceled.

In FIG. 16B, the status of the IOM 521-1 and 521-3 has been changed to "ONLINE" which is a status indicating that a normal operation is being performed on the 0 system route (see arrows P2 and P3).

In the case where the firmware management processing unit of the CM continues the firmware switching processing even when the IOM 521 is in use in the I/O processing, the firmware management processing unit resets the IOM 521 which has already been incorporated after completion of degeneration and is regarded as a normal module (IOM reset). In the example illustrated in FIG. 16B, the IOMs 521-1 and 521-3 have been reset (see the arrows P2 and P3).

Here, in the monitoring processing of the CM, the state of the IOM 521 is regularly monitored, and processing for inquiring the state of the IOM 521 which is in the "normal" status by polling is performed (inquiry about the IOM state). Accordingly, when the status of the IOM 521 becomes "ONLINE", the monitoring processing unit of the CM regularly monitors the state of the IOM 521 by polling. Further, the IOMs 521 making a pair in the DE 520 monitor each other and respond a state with respect to an inquiry about an IOM state received from the monitoring processing unit of the CM.

Here, during reset of an IOM 521 (for example, the IOM 521-3), communication with the other IOM 521 (for example, the IOM 521-4) paired with the IOM 521 (for example, the IOM 521-3) becomes temporarily difficult. Therefore, when the monitoring processing unit inquires the IOM state of the IOM 521 (for example, the IOM 521-3) at this timing, the IOM 521 (for example, the IOM 521-4) paired with the IOM 521 (for example, IOM 521-3), which has been reset, may be erroneously detected as being removed. As a result, there is a problem in that a route to the DE 520 in which these IOMs 521 (for example, the IOMs 521-3 and 521-4) are stored disappears.

In one aspect of the present disclosure, it is possible to perform a stable device operation even when active firmware application processing is performed.

A storage control device and a storage control program according to an embodiment of the present disclosure will be described below with reference to the accompanying drawings. However, the embodiment described below is merely an example, and there is no intention to exclude various modifications and application of techniques which are not explicitly described in the embodiment. That is, the present embodiment may be implemented with various modifications without departing from the gist thereof. Further, each drawing is not intended to include only constituent elements illustrated in the drawing, but may include other functions and the like.

(A) Device Configuration

Figure 1:
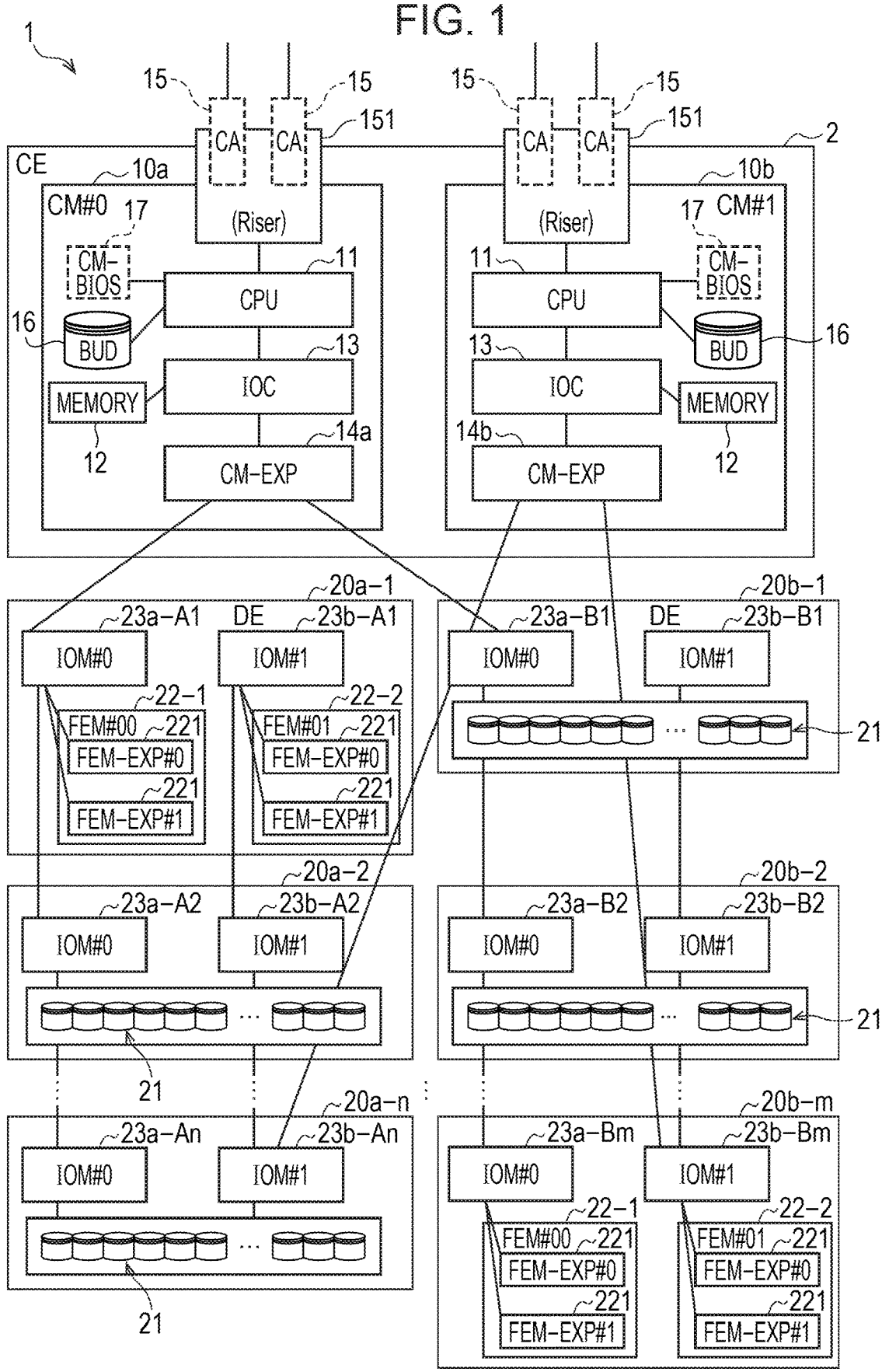
FIG. 1 is a diagram schematically illustrating the hardware configuration of a storage apparatus as an example of an embodiment.
Figure 2:
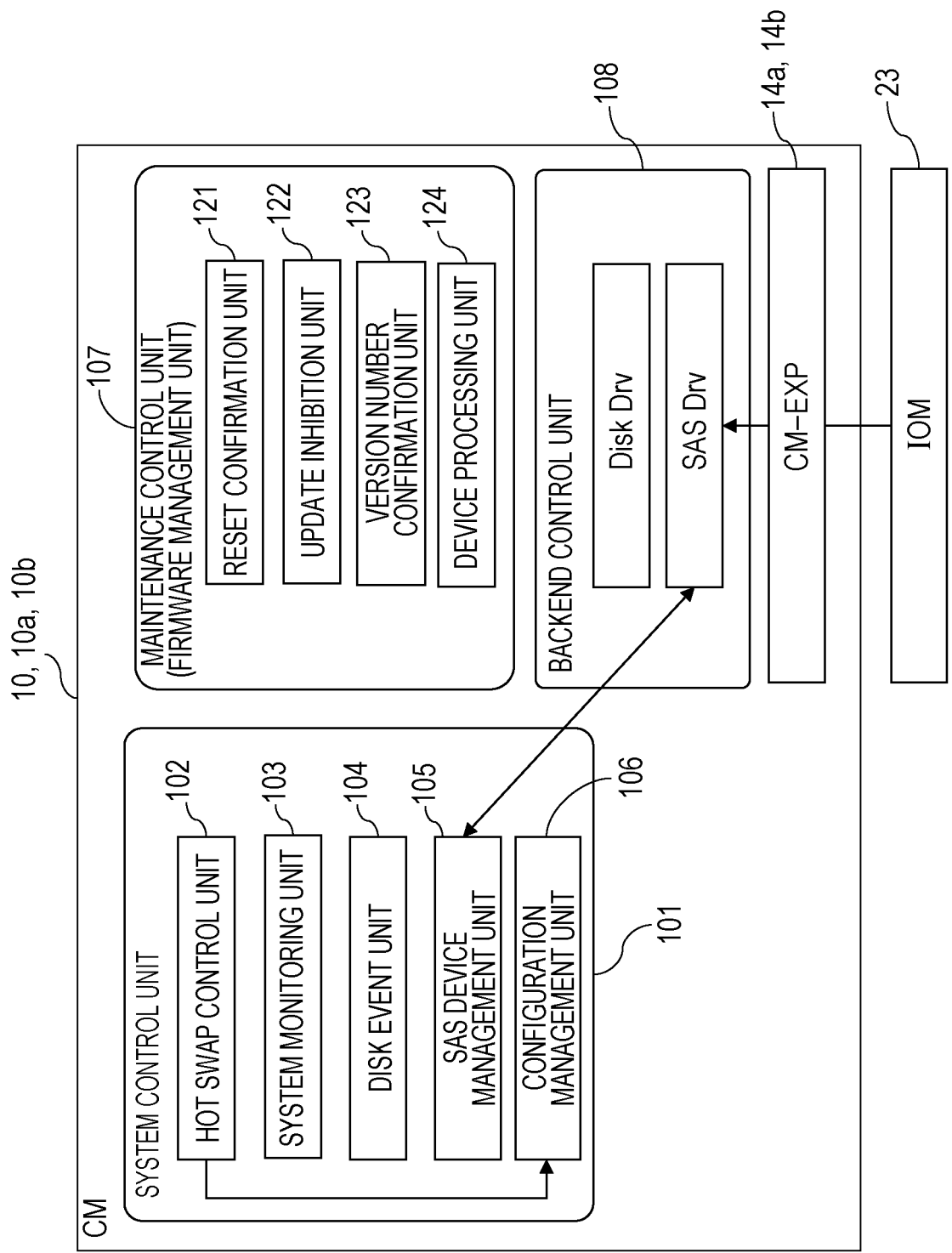
FIG. 2 is a diagram illustrating the functional configuration of the storage apparatus as an example of the embodiment.

FIG. 1 is a diagram schematically illustrating the hardware configuration of a storage apparatus 1 as an example of the embodiment and FIG. 2 is a diagram illustrating the functional configuration of the storage apparatus 1.

The storage apparatus 1 in one example of the present embodiment is communicably connected to one or more host devices, which are not illustrated, via a communication line such as a local area network (LAN) cable and provides a storage area to the host device(s).

The storage apparatus 1 mounts a plurality of storage devices 21, which will be described later, and distributes data to the plurality of storage devices 21 by using redundant arrays of inexpensive disks (RAID) so as to save the data in a redundant state. The storage apparatus 1 includes a CE 2 and a plurality of DEs 20a-1 to 20a-n and 20b-1 to 20b-m (where n and m are natural numbers, respectively).

In the following description, as the reference character denoting the DE, the reference characters 20a-1 to 20a-n and 20b-1 to 20b-m are used when one of the plurality of DEs is specified. However, when an arbitrary DE is denoted, the reference numeral 20 is used.

The CE 2 includes a plurality of (two in the example illustrated in FIG. 1) CMs 10a and 10b.

The CMs 10a and 10b are control devices (controllers or storage control devices) which control an operation in the storage apparatus 1. The CMs 10a and 10b perform various types of control such as control of data access to the storage device 21 of the DE 20 in accordance with an I/O request transmitted from the host device and the like. Further, the CMs 10*a* and 10*b* have the configurations which are the same as each other. In the following description, as the reference character denoting the CM, the reference characters 10*a* and 10*b* are used when one of the plurality of CMs has to be specified. However, when an arbitrary CM is denoted, the reference numeral 10 is used. Further, the CM 10*a* is sometimes referred to as CM #0, and the CM 10*b* is sometimes referred to as CM #1.

The CM #0 and CM #1 are communicably connected to each other via a communication line (not illustrated) such as a peripheral component interconnect express (PCIe) bus, for example, and each CM 10 and each DE 20 are communicably connected to each other via a bus line, for example.

The DE 20 is a device housing in which the storage devices 21 and IOMs 23*a*-A1 to 23*a*-An, 23*b*-A1 to 23*b*-An, 23*a*-B1 to 23*a*-Bm, and 23*b*-B1 to 23*b*-Bm are mounted.

The DE 20 is communicably connected to each of the two CMs #0 and #1 via a data access path, and each DE 20 includes two IOMs 23 and a plurality of storage devices 21 or FEMs 22.

Here, as the reference character denoting the IOM, reference characters 23*a*-A1 to 23*a*-An, 23*b*-A1 to 23*b*-An, 23*a*-B1 to 23*a*-Bm, and 23*b*-B1 to 23*b*-Bm are used when one of the plurality of IOMs has to be specified. However, when an arbitrary IOM is denoted, the reference numeral 23 is used.

In the example illustrated in FIG. 1, two FEMs 22-1 and 22-2 are provided to the DE 20*a*-1 and the DE 20*b*-*m*, and a plurality of storage devices 21 are provided to the DEs 20 other than the DE 20*a*-1 and the DE 20*b*-*m*.

The storage devices 21 are known devices which store data in a readable and writable manner, and are HDDs or SSDs, for example. These storage devices 21 have the functional configurations which are the same as each other. A part of the plurality of storage devices 21 provided to each DE 20 functions as a hot spare.

Here, in the following description, as the reference numeral denoting the FEM, the reference numerals 22-1 and 22-2 are used when one of the plurality of FEMs has to be specified. However, when an arbitrary FEM is denoted, the reference numeral 22 is used.

The FEM 22 performs processing for transferring a serial attached small computer system interface (SAS) frame received by the IOM 23 to the storage device 21 designated by the CM 10. Further, the FEM 22 mounts a fan and cools the inside of the DE 20 as well. The FEM 22 is a module with a second tier expander for 3.5-inch high density drive enclosure, for example.

Further, the FEM 22 includes one or more (two in the example illustrated in FIG. 1) FEM-expanders (FEM-EXPs) 221. The FEM-EXP 221 is an expander chip for serial advanced technology attachment (SAS/SATA) connection.

The DE 20*a*-1 includes the IOMs 23*a*-A1 and 23*b*-A1. In a similar manner, the DE 20*a*-2 includes the IOM 23*a*-A2 and 23*b*-A2, the DE 20*a*-*n* includes the IOM 23*a*-An and 23*b*-An, the DE 20*b*-1 includes the IOM 23*a*-B1 and 23*b*-B1, the DE 20*b*-2 includes the IOM 23*a*-B2 and 23*b*-B2, and the DE 20*b*-*m* includes the IOM 23*a*-Bm and 23*b*-Bm. Thus, in each DE 20, the IOM 23 is duplicated.

In the DE 20*a*-1, the IOM 23*b*-A1 respectively control the FEM 22-1 and the FEM 22-2. In a similar manner, in the DE 20*b*-*m*, the IOM 23*a*-Bm and the IOM 23*b*-Bm respectively control the FEM 22-1 and the FEM 22-2.

Further, in the DE 20*a*-2, each of the IOMs 23*a*-A2 and 23*b*-A2 controls data access to the storage device 21. In a similar manner, in the DE 20*a*-*n*, each of the IOMs 23*a*-An and 23*b*-An controls data access to the storage device 21. Further, in the DE 20*b*-1, each of the IOMs 23*a*-B1 and 23*b*-B1 controls data access to the storage device 21. Further, in the DE 20*b*-2, each of the IOMs 23*a*-B2 and 23*b*-B2 controls data access to the storage device 21.

The IOM 23*a*-A1, the IOM 23*a*-A2, ..., and the IOM 23*a*-An are cascade-connected in this order to a CM-EXP 14*a*, which will be described later, of the CM 10*a* (CM #0). Further, the IOM 23*a*-B1, the IOM 23*a*-B2, ..., and the IOM 23*a*-Bm are also cascade-connected to the CM-EXP 14*a* in this order.

In this way, the route on which the IOM 23*a*-A1, the IOM 23*a*-A2, ..., and the IOM 23*a*-Am are connected from the CM-EXP 14*a* of the CM 10*a* and a route on which the IOM 23*a*-B1, the IOM 23*a*-B2, ..., and the IOM 23*a*-Bm are connected from the CM-EXP 14*a* are sometimes referred to as the 0 system route. Further, the IOM 23 connected on the 0 system route is sometimes referred to as the IOM #0.

Each IOM 23 connected on the 0 system route is managed by the CM 10*a* (CM #0) of the 0 system.

Further, the IOM 23*b*-Bm, ..., the IOM 23*b*-B2, and the IOM 23*b*-B1 are cascade-connected in this order to the CM-EXP 14*b*, which will be described later, of the CM 10*b* (CM #1). Further, the IOM 23*b*-An, ..., the IOM 23*b*-A2, and the IOM 23*b*-A1 are also cascade-connected to the CM-EXP 14*b* in this order.

In this way, the route on which the IOM 23*b*-Bm, ..., the IOM 23*b*-B2, and the IOM 23*b*-B1 are connected from the CM-EXP 14*b* of the CM 10*b* and the route on which the IOM 23*b*-An, ..., the IOM 23*b*-A2, and the IOM 23*b*-A1 are connected from the CM-EXP 14*b* are sometimes referred to as the 1 system route. Further, the IOM 23 connected on the 1 system route is sometimes referred to as the IOM #1.

Each IOM 23 connected on the 1 system route is managed by the CM 10*b* (CM #1) of the 1 system. Also, cabling of the 1 system route is reversed to cabling of the 0 system route.

The CM 10 is a storage control device which performs various types of control. The CM 10 performs various types of control in accordance with a storage access request (access control signal: hereinafter referred to as the host I/O) from a host device which is not illustrated.

As illustrated in FIG. 1, the CM 10 includes a central processing unit (CPU) 11, a memory 12, an IOC 13, the CM-EXP 14*a* (14*b*), a bootup and utility device (BUD) 16, a CM-BIOS memory 17, and a CA 15.

The CA 15 is an adapter by which data transmitted from an external device, which is not illustrated, such as a host device and a management terminal is received and data, which is to be outputted from the CM 10, is transmitted to an external device. That is, the CA 15 controls input and output of data from/to an external device.

The CA 15 is, for example, a network adapter which communicably connects with an external device via a network attached storage (NAS) and is a LAN interface or the like, for example. Each CM 10 is connected with an external device using the CA 15 through the NAS via a communication line, which is not illustrated, and performs reception of I/O requests, transmission and reception of data, and the like. In the example illustrated in FIG. 1, two CAs 15 are provided to each of the CMs 10*a* and 10*b*.

Further, the CA 15 may be a network adapter which communicably connects with an external device via a storage area network (SAN). That is, for example, the CA 15 may be an Internet Small Computer System Interface (iSCSI) or a fiber channel (FC) interface. Each CM 10 may be connected with an external device using the CA 15 through the SAN via a communication line, which is not illustrated, and perform reception of I/O requests, transmission and reception of data, and the like.

In each CM 10, a plurality of CAs 15 are provided to a riser card (daughter card) 151 which is configured to be detachable from the CM 10.

The CM-EXPs 14a and 14b are extension interfaces (expanders) for communicably connecting with the DE 20, the storage device 21, and the like and are configured as integrated circuit (IC) chips, for example. The CM-EXPs 14a and 14b function as a switch for connecting the CM 10 and a plurality of storage devices 21.

Here, in the following description, as the reference character denoting the CM-EXP, the reference characters 14a and 14b are used when one of the plurality of CM-EXPs has to be specified. However, when an arbitrary CM-EXP is denoted, the reference numeral 14 is used.

To the CM-EXP 14, the storage device 21 of the DE 20 is connected. Each CM 10 performs access control with respect to the storage device 21 based on an I/O request received from a host device.

Each CM 10 performs writing and reading of data with respect to the storage device 21 via the CM-EXP 14.

In the present embodiment, an example in which the IOM 23 provided in each DE 20 is a module (electronic device or electronic component) which is a firmware switching target is described. Hereinafter, the IOM 23 is sometimes referred to as the module or the component.

Each IOM 23 includes a storage area (memory or storage unit) for storing new firmware after revision. The IOM 23 reads out new firmware stored in this storing area and applies the new firmware to the IOM 23 itself at the time of activation (at the time of activation by reset, at the time of reboot, or at the time of restart) thereof, thereby revising the firmware. Hereinafter, it is assumed that reset of the IOM 23 includes reboot (restart).

If the new firmware read from the storage area is applied to the IOM 23, the new firmware is not present in the storage area, making impossible to read the new firmware from this storage area.

The CM-BIOS memory 17 stores a basic input output system (BIOS) executed by the CPU 11 at the time of activation of the CM 10.

The memory 12 is a storage device including a read only memory (ROM) and a random access memory (RAM). In the ROM of the memory 12, a software program is written. The software program on the memory 12 is appropriately read and executed by the CPU 11. Further, the RAM of the memory 12 is used as a temporarily-storing memory or a working memory and temporarily stores a BIOS read from the CM-BIOS memory 17 or a software program. In the example of the present embodiment, firmware switching progress information 201, which will be described later, or the like is stored in the memory 12.

The IOC 13 is a control device which control data transfer in the CM 10 and realizes direct memory access (DMA) transfer in which data stored in the memory 12 is transferred without the intermediary of the CPU 11, for example.

The BUD 16 is a storage device which stores dump data copied from the CA 15, for example.

The CPU 11 is a processing device which performs various types of control and calculations and is, for example, a multi-core processor (multi-core CPU). The CPU 11 executes an operating system (OS) and a program, which are stored in the memory 12 or the like, so as to realize various types of functions. Especially, in the present embodiment, when the CPU 11 executes a storage control program, the CPU 11 functions as a system control unit 101, a maintenance control unit 107, and a backend control unit 108 which are illustrated in FIG. 2.

A program for realizing the functions of the system control unit 101, the maintenance control unit 107, and the backend control unit 108 (storage control program) is provided in a form recorded on a computer-readable recording medium such as a flexible disk, a CD (CD-ROM, CD-R, CD-RW, or the like), a DVD (DVD-ROM, DVD-RAM, DVD-R, DVD+R, DVD-RW, DVD+RW, HD DVD, or the like), a Blu-ray disc, a magnetic disk, an optical disk, and a magneto optical disk. Then, a computer reads the program from the recording medium and transfers and stores the program to and in an internal storage device or an external storage device so as to use the program. Further, the program may be preliminarily recorded on a storage device (recording medium) such as a magnetic disk, an optical disk, and a magneto optical disk so as to be provided to a computer from the storage device via a communication route.

When the functions as the system control unit 101, the maintenance control unit 107, and the backend control unit 108 are realized, a program stored in the internal storage device (the RAM or the ROM of the memory 12 in the present embodiment) is executed by a microprocessor (the CPU 11 in the present embodiment) of the computer. At this time, the computer may read and execute the program recorded on the recording medium.

The backend control unit 108 includes drivers by which each component of the firmware in the CM 10 performs disk access with respect to the storage device 21. When each component of the firmware performs disk access, each component performs data access to the storage device 21 via an interface provided by a disk driver (Disk Drv). The disk driver accesses the storage device 21 via a SAS driver (SAS Drv).

The SAS driver issues broadcast change (BC) when a notification of a change in a device connection state is inputted from the CM-EXPs 14a and 14b.

The system control unit 101 controls switching of firmware of each module provided to the storage apparatus 1 of the present embodiment. As illustrated in FIG. 2, the system control unit 101 has functions as a hot swap control unit 102, a system monitoring unit 103, a disk event unit 104, an SAS device management unit 105, and a configuration management unit 106.

The hot swap control unit 102 provides a function of exchanging (hot swapping) a failed module (faulty component) without stopping the storage apparatus 1 of the present embodiment (stopping the system). For example, when a hot swap target component is inserted in and removed from a slot, which is not illustrated, of the DE 20 and replaced, the hot swap control unit 102 performs incorporation processing into the storage apparatus 1 of the present embodiment until the status of the target component becomes "ONLINE".

The system monitoring unit 103 monitors a state of each module mounted on the storage apparatus 1 of the present embodiment and controls the system in accordance with each detected state. In the case where a state of each module has changed, the system monitoring unit 103 executes processing such as module separation processing and status change processing in accordance with the state.

The SAS device management unit 105 manages information on a device on a SAS domain (SAS). When a BC is issued by the backend control unit 108, the SAS device management unit 105 creates a SAS map in response to the BC. Further, the SAS device management unit 105 also has a function of recognizing a mount state of the IOM 23.

In the case where a device such as the IOM 23 is in a usable state, the SAS device management unit 105 incorporates the device as a using device. Further, in the case where firmware applied to a device is new firmware, the SAS device management unit 105 functions as an incorporation unit which incorporates this device as a using device.

Further, in the case where change is generated in the SAS device information in the background, the SAS device management unit 105 issues an event notification (Event Notify).

In the case where a change is generated in the SAS device information in the background, the disk event unit 104 is activated in response to an Event Notify notified by the SAS device management unit 105. The disk event unit 104 analyzes a table of the SAS device information and mainly performs incorporation and separation of the storage device 21.

The functions of the above-described components of the system control unit 101 are known and a detailed description thereof will be omitted.

The configuration management unit 106 manages information on the whole system such as various setting information and component information in the storage apparatus 1 of the present embodiment. The configuration management unit 106 manages various types of information such as configuration regarding each module (component) included in the storage apparatus 1 of the present embodiment as device configuration information (not illustrated).

For example, the configuration management unit 106 refers to the device configuration information so as to extract a device whose configuration has changed (for example, the IOM 23).

Further, the configuration management unit 106 has a function of performing degeneration processing for degenerating a module in which an abnormality has occurred. The configuration management unit 106 sets "DEGRADE", which indicates that degeneration has been completed, in configuration management information for a module to be degenerated.

Further, the configuration management unit 106 sets "CFL_BOOT" as a special status, which indicates that firmware is being switched, in the configuration management information for a module undergoing firmware switching.

Further, the configuration management unit 106 sets "ONLINE" as a status, which indicates that a normal operation is being performed, in the configuration management information for a module which is being normally operated.

Here, the device configuration information for managing information on each module in the storage apparatus is known and the description thereof will be omitted.

The maintenance control unit 107 receives a command which is inputted by a user or the like via a graphical user interface (GUI) or a command line interface (CLI) of a management terminal, which is not illustrated, and manages a sequence of the whole processing on maintenance such as update of firmware in the storage apparatus 1 of the present embodiment. The maintenance control unit 107 performs active firmware application processing with respect to a device (electronic device) such as the IOM 23 provided to the storage apparatus 1 of the present embodiment.

For example, the maintenance control unit 107 issues a firmware switching command with respect to the IOM 23 which is a firmware switching target. In the case where the IOM 23 which has received the firmware switching command is in a normal operation state and in a state in which new firmware has been stored in a storage area of the IOM 23, the IOM 23 makes a normal response to the maintenance control unit 107. In the case where new firmware has not been stored in the storage area of the IOM 23, the IOM 23 makes an error response (abnormal response) indicating the state to the maintenance control unit 107. For example, in the case where, after new firmware is stored in a storage area of the IOM 23, the IOM 23 is rebooted and application of the new firmware in the storage area is performed in the reboot process, such state that no firmware is present in the storage area is generated. If the IOM 23 receives a firmware switching command in this state, switching of firmware fails and the IOM 23 makes an error response indicating that new firmware is not stored with respect to the maintenance control unit 107.

Further, the maintenance control unit 107 has a function as a firmware management unit which manages various types of information on firmware of each module (component) of the storage apparatus 1 of the present embodiment.

In the present embodiment, an example in which the IOM 23 provided to each DE 20 is set as a firmware switching target module (component), as mentioned above, is described.

The maintenance control unit 107 manages the firmware switching progress information 201 (shown in FIG. 3).

FIG. 3 is a diagram illustrating the configuration of the firmware switching progress information 201 in the storage apparatus 1 as an example of the embodiment.

The firmware switching progress information 201 is progress information indicating a progress state of a firmware switching operation. The firmware switching progress information 201 is stored in an area which is used for storing various types of data when firmware active switching is performed (firmware active switch control area) in the memory 12.

The firmware switching progress information 201 illustrated in FIG. 3 includes control CM ID, switching destination operation surface, first half system, second half system, error information, applied firmware information, overall status, the number of target modules, and component progress status information.

The control CM ID is information for specifying the CM 10 which controls switching of firmware (CM ID).

The switching destination operation surface indicates an area in which new firmware is stored. The first half system indicates whether rewriting of firmware is first performed in the 0 system or the 1 system for the first half system. The second half system indicates whether rewriting of firmware is first performed in the 0 system or the 1 system for the second half system. The error information indicates information on an error in the case where the error has occurred.

The applied firmware information is information on a version number of firmware to be applied (firmware version number information).

FIG. 4 illustrates a configuration example of firmware version number information in the storage apparatus 1 as an example of the embodiment. The firmware version number information illustrated in FIG. 4 includes version, level, and suffix of firmware.

The overall status indicates a status of the whole of the storage apparatus 1 of the present embodiment. The number of target modules indicates the total number of modules which are firmware revision targets.

The component progress status information indicates a progress state of firmware revision in individual modules. In the example illustrated in FIG. 4, a plurality of pieces (n pieces) of component progress status information are indicated by providing identification information of [0] to [n−1] to a plurality of pieces of component progress status information.

FIG. 5 illustrates a configuration example of the component progress status information in the storage apparatus 1 as an example of the embodiment. The component progress status information illustrated in FIG. 5 includes component ID, component sub information, firmware type, and progress information.

The component ID is identification information for specifying the IOM 23 which is a module of firmware revision target. The component sub information is information on a module specified by the component ID. The firmware type is a type of firmware. The progress information is information indicating a progress state of the firmware rewriting operation and indicates any state of preparing, separating, separation completion, rebooting, reboot completion, incorporating, and incorporation completion, for example.

In the storage apparatus 1 of the present embodiment, information for managing a version number of firmware is also included in the device configuration information used by the configuration management unit 106 for managing the configuration or the like of each module.

FIG. 6 is a diagram illustrating firmware version number management information included in the device configuration information in the storage apparatus 1 as an example of the embodiment.

The firmware version number management information illustrated in FIG. 6 includes operation surface, next operation surface, and version number information of whole firmware.

The operation surface indicates a storage area which stores firmware which is currently applied to a module. The next operation surface indicates a storage area which stores new firmware which will be used at the time of next revision of firmware.

The version number information of whole firmware is information on firmware of each module provided to the storage apparatus 1 of the present embodiment. In the example illustrated in FIG. 6, information for two generations is indicated by registering identification information of [0] or [1] as version number information of two whole firmware.

FIG. 7 is a diagram illustrating version number information of whole firmware in the storage apparatus 1 as an example of the embodiment.

The version number information of whole firmware illustrated in FIG. 7 includes valid flag and overall version number, and further includes a plurality of component version numbers and date which is associated with each of the overall version number and the plurality of component version numbers.

The valid flag indicates whether or not the corresponding firmware is valid. The overall version number indicates an overall version number of firmware. The overall version number has the format same as that of the firmware version number information illustrated in FIG. 4. Further, with this overall version number, a date on which the corresponding firmware is registered is associated.

The component version number is information on firmware of a corresponding module and has the format same as that of the firmware version number information illustrated in FIG. 4. Further, with this component version number, a date on which the corresponding firmware is registered is associated.

Referring back to FIG. 2, the maintenance control unit 107 includes functions of a reset confirmation unit 121, an update inhibition unit 122, a version number confirmation unit 123, and a device processing unit 124.

The reset confirmation unit 121 confirms whether or not reset processing for firmware switching has been operated in the IOM 23 which is recognizable from the CM 10 and in a state possible to be incorporated in the storage apparatus 1 of the present embodiment. For example, the reset confirmation unit 121 inquires of the maintenance control unit (firmware management unit) 107 and refers to the firmware switching progress information 201, being able to figure out the IOM 23 which is in a state possible to be incorporated in the storage apparatus 1 of the present embodiment.

In the case where the reset confirmation unit 121 receives an error response from the IOM 23 for a firmware switching command issued with respect to the IOM 23 and processing for degenerating this IOM 23 is operated, the reset confirmation unit 121 confirms states of the IOMs 23 other than the IOM 23 which is degenerated.

The reset confirmation unit 121 confirms a state of switching to new firmware for the IOMs 23 on the same system route (the same connection group) as the IOM 23 which is in the firmware switching processing.

Specifically, the reset confirmation unit 121 inquires of the maintenance control unit (firmware management unit) 107 and refers to the firmware switching progress information 201 so as to confirm whether or not an operation of the reset processing for firmware switching has been completed in the IOM 23. That is, the reset confirmation unit 121 confirms whether or not reboot with firmware revision has been completed in the IOM 23.

Thus, the reset confirmation unit 121 functions as a confirmation unit which confirms whether or not switching to new firmware has been completed in the IOMs 23a-1 and 23a-2 which are on the same connection route as the IOM 23a-4 which is a firmware switching target, among a plurality of IOMs 23. Here, the reset confirmation unit 121 may refer to the firmware switching progress information 201 so as to confirm whether or not the operation of the reset processing for firmware switching has been completed in the IOM 23.

The update inhibition unit 122 temporarily inhibits incorporation of the IOM 23 into the storage apparatus 1 of the present embodiment. This IOM 23 is determined such that the reset processing for firmware switching has not been operated, that is, switching to new firmware has not been performed, as a result of confirmation of the reset confirmation unit 121. For example, the update inhibition unit 122 maintains the status of this IOM 23 as "CFL_BOOT" (or sets to "CFL_BOOT") in the device configuration information managed by the configuration management unit 106. Accordingly, incorporation of this IOM 23 is not executed in prolongation of the degeneration processing, and the incorporation of this IOM 23 into the storage apparatus 1 of the present embodiment is executed when the firmware switching processing is executed subsequently.

Thus, the update inhibition unit 122 functions as an inhibition unit which inhibits incorporation of the IOMs 23a-1 and 23a-2 as using devices (inhibits an incorporation request to the system) in the case where switching to new firmware has not been completed (reset has not been performed in progress management) in the IOMs 23a-1 and 23a-2. On the other hand, as for the IOM 23 which is determined such that the reset processing for firmware switching has been operated, that is, switching to new firmware has been performed, as a result of confirmation of the reset confirmation unit 121, the update inhibition unit 122 permits incorporation of this IOM 23 into the storage apparatus 1 of the present embodiment. For example, the update inhibition unit 122 sets a status of the corresponding IOM 23 concerned to a value indicating an incorporation target, in the device configuration information managed by the configuration management unit 106.

FIGS. 8A and 8B are diagrams illustrating a process of the firmware switching processing in the storage apparatus 1 as an example of the embodiment. After the state of FIG. 8A, the state shifts to the state of FIG. 8B.

Here, the storage apparatus 1 illustrated in these FIGS. 8A and 8B includes four DEs 20 which are DEs 20-1 to 20-4 and includes eight IOMs 23 which are IOMs 23a-1 to 23a-4 and IOMs 23b-1 to 23b-4. The DEs 20-1, 20-2, 20-3, and 20-4 are sometimes referred to as the DEs #00, #01, #02, and #03, respectively.

In FIG. 8A, "CFL_BOOT" is set as a special status indicating that firmware is being switched with respect to each of the IOMs 23a-1, 23a-2, and 23a-4 on the 0 system route. Further, "ONLINE" is set as a status indicating that a normal operation is being performed with respect to each of the IOMs 23b-1 to 23b-4 on the 1 system route.

Further, in the storage apparatus 1 illustrated in FIG. 8A, the IOMs 23a-4, 23a-3, 23a-2, and 23a-1 are rebooted (reset) in this order on the 0 system route.

Furthermore, in the state illustrated in FIG. 8A, after reset of the IOM 23a-4 is performed (see an arrow S1), reset is failed in the IOM 23a-3 and "DEGRADE" indicating a degenerated state is set for this IOM 23a-3 (see an arrow S2).

The maintenance control unit 107 issues a firmware switching command with respect to each of the IOMs 23a-1 to 23a-4 which are firmware switching targets and the IOM 23a-3 transmits an error response with respect to this firmware switching command. Then, processing for degenerating this IOM 23a-3 is operated.

The reset confirmation unit 121 confirms whether or not reset processing for firmware switching has been operated in the IOMs 23a-1 and 23a-2 which are recognizable from the CM 10 and are in a state possible to be incorporated in the storage apparatus 1 of the present embodiment, by referring to the SAS map, for example. In this example, the reset processing for firmware switching is not operated in the IOMs 23a-1 and 23a-2 (see arrows S3 and S4), as illustrated in FIG. 8B.

After that, the update inhibition unit 122 maintains the status of the IOMs 23a-1 and 23a-2, in which the reset processing for firmware switching has not been operated as a result of confirmation by the reset confirmation unit 121, as "CFL_BOOT" (see arrows S5 and S6). Accordingly, state inquiry by polling by the monitoring processing of the CM 10 is not executed with respect to the IOMs 23a-1 and 23a-2. Therefore, degeneration of these IOMs 23a-1 and 23a-2 is not executed, and when the firmware switching processing is executed subsequently, reset is performed and new firmware is applied at this timing.

In the case where the version number confirmation unit 123 receives an error response from the IOM 23 with respect to a firmware switching command issued to the IOM 23, the version number confirmation unit 123 refers to the firmware switching progress information 201, for example, so as to confirm a firmware version number of this IOM 23.

In the case where the firmware of this IOM 23 has been switched to new firmware as a result of the confirmation by the version number confirmation unit 123, the device processing unit 124 recognizes the IOM 23 as being normal and executes a reboot instruction so as to incorporate the IOM 23 into the storage apparatus 1 of the present embodiment. On the other hand, in the case where the firmware of the IOM 23 is not accorded with a version number of new firmware, the device processing unit 124 determines that this IOM 23 is an abnormal component. The device processing unit 124 executes degeneration processing for separating this IOM 23, which is determined as the abnormal component, from the storage apparatus 1 of the present embodiment.

(B) Operation

Figure 9:
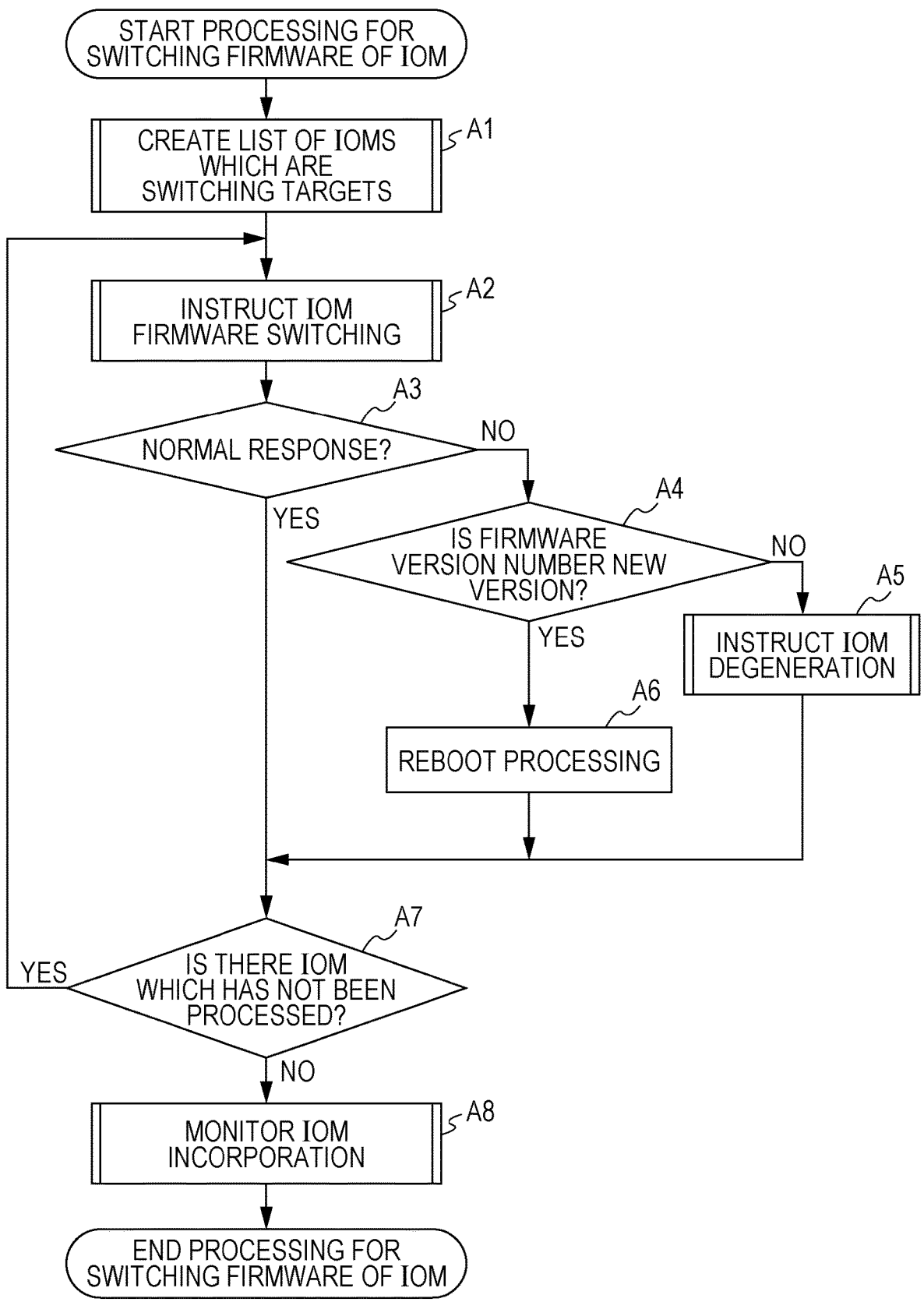
FIG. 9 is a flowchart illustrating processing for switching firmware of an IOM in the storage apparatus as an example of the embodiment.

The processing for switching firmware (steps A1 to A8) of the IOM 23 in the storage apparatus 1 as an example of the embodiment configured as described above will be described with reference to FIG. 9.

In step A1, the maintenance control unit 107 creates a list of IOMs 23 which are targets subjected to firmware switching. For example, the maintenance control unit 107 acquires the IOMs 23 provided to the storage apparatus 1 of the present embodiment from the configuration management unit 106 so as to figure out the IOMs 23 which are the firmware switching targets.

In step A2, the maintenance control unit 107 issues a firmware switching instruction (firmware switching command) of the IOMs 23.

In step A3, the version number confirmation unit 123 confirms whether or not the IOMs 23 have made normal responses with respect to the firmware switching command which is issued.

In the case where the version number confirmation unit 123 receives an error response from the IOM 23 for the firmware switching command issued to the IOMs 23, that is, in the case where a normal response is not made from the IOM 23 (see the NO route of step A3), the processing shifts to step A4.

In step A4, the version number confirmation unit 123 refers to the firmware switching progress information 201, for example, and confirms the firmware version number of this IOM 23 so as to confirm whether or not the firmware is a new version.

In the case where the firmware of the IOM 23 is a new version as a result of the confirmation (see the YES route of step A4), the device processing unit 124 performs a reboot instruction with respect to the IOM 23 concerned in step A6 so as to apply the new firmware.

On the other hand, in the case where the firmware of the IOM 23 is not a new version as a result of the confirmation (see the NO route of step A4), the processing shifts to step A5.

In step A5, the device processing unit 124 issues a degeneration instruction for separating the IOM 23 concerned from the storage apparatus 1 of the present embodiment so as to execute the degeneration processing.

After that, in step A7, the maintenance control unit 107 confirms whether or not there is the IOM 23 which has not been processed in the list of the IOMs 23 which is created in step A1.

In the case where there is the IOM 23 which has not been processed (see the YES route of step A7), the processing returns to step A2.

In the case where there is no IOM 23 which has not been processed (see the NO route of step A7), the processing shifts to step A8.

In step A8, the maintenance control unit 107 monitors an incorporation state of the IOM 23 and ends the processing.

Figure 10:
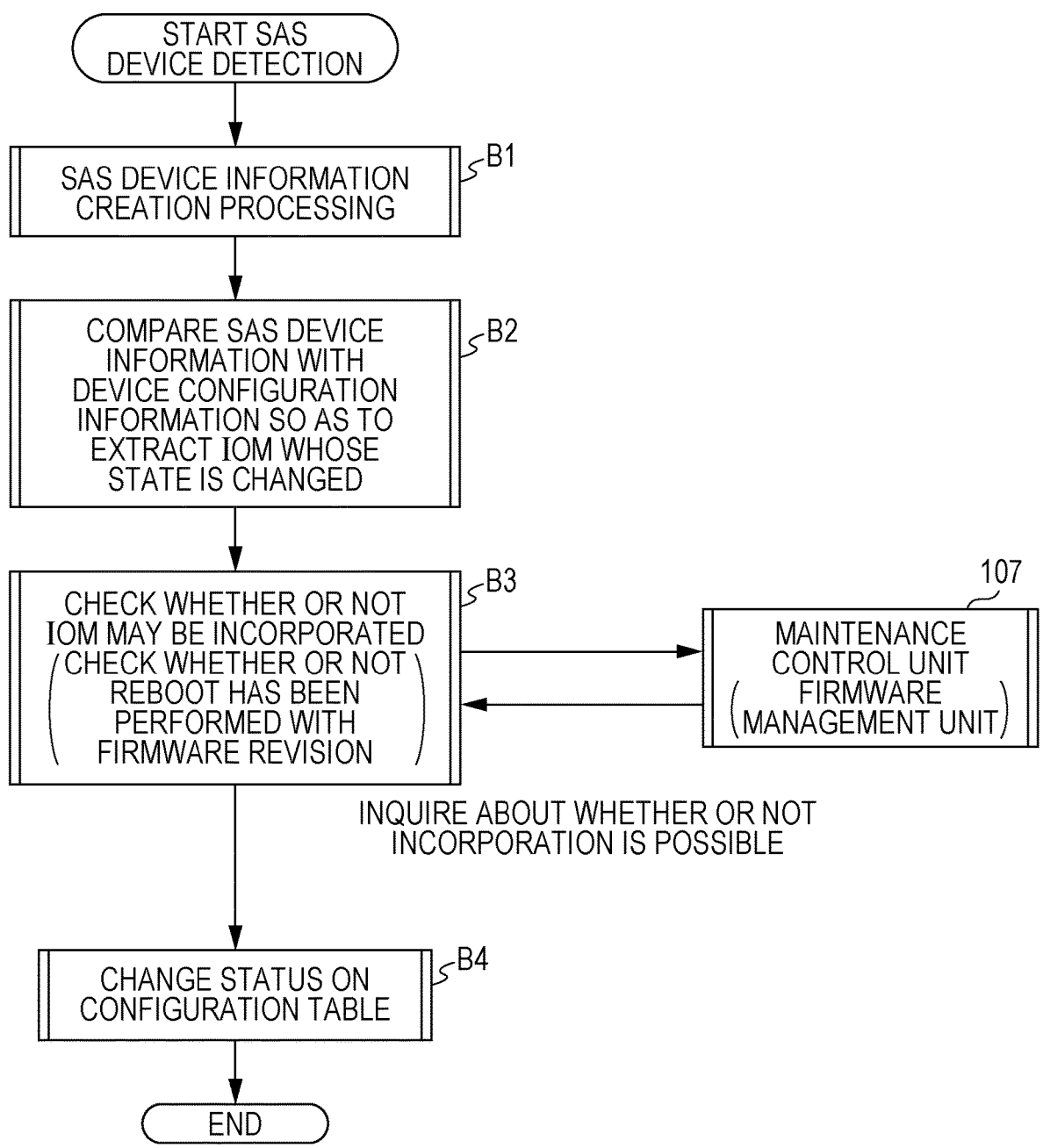
FIG. 10 is a flowchart illustrating processing for incorporating an IOM, firmware of which is being switched, in the storage apparatus as an example of the embodiment.

Next, the processing for incorporating the IOM 23, the firmware of which is being switched, in the storage apparatus 1 as an example of the embodiment will be described with reference to a flowchart (steps B1 to B4) illustrated in FIG. 10.

For example, when the SAS device management unit 105 detects configuration change of a SAS device, the configuration management unit 106 is notified of the configuration change.

In step B1, the configuration management unit 106 performs processing for creating SAS device information and manages a device which is to be mounted on the storage apparatus 1 of the present embodiment.

In step B2, the configuration management unit 106 compares the SAS device information which is created with device configuration information so as to extract the IOM 23 whose state is changed.

In step B3, the reset confirmation unit 121 inquires of the maintenance control unit (firmware management unit) 107 and refers to the device configuration information so as to confirm whether or not the IOM 23 which is a processing target is in a state possible to be incorporated in the storage apparatus 1 of the present embodiment. Here, a specific method for determining whether or not the IOM 23 may be incorporated will be described later with reference to FIG. 11.

In step B4, the configuration management unit 106 updates the status of the IOM 23 on the device configuration information with the latest status. For example, as for the IOM 23 which is determined such that the reset processing for firmware switching has been operated, that is, switching to new firmware has been performed, the update inhibition unit 122 permits incorporation of this IOM 23 into the storage apparatus 1 of the present embodiment. That is, in the device configuration information managed by the configuration management unit 106, the status of this IOM 23 is changed to "ONLINE".

As for the IOM 23 which is determined such that the reset processing for firmware switching has not operated, that is, switching to new firmware has not been performed, the update inhibition unit 122 inhibits update of the status of this IOM 23 and maintains the status of this IOM 23 as "CFL_BOOT" (or sets to "CFL_BOOT") in the device configuration information. After that, the processing is ended.

Figure 11:
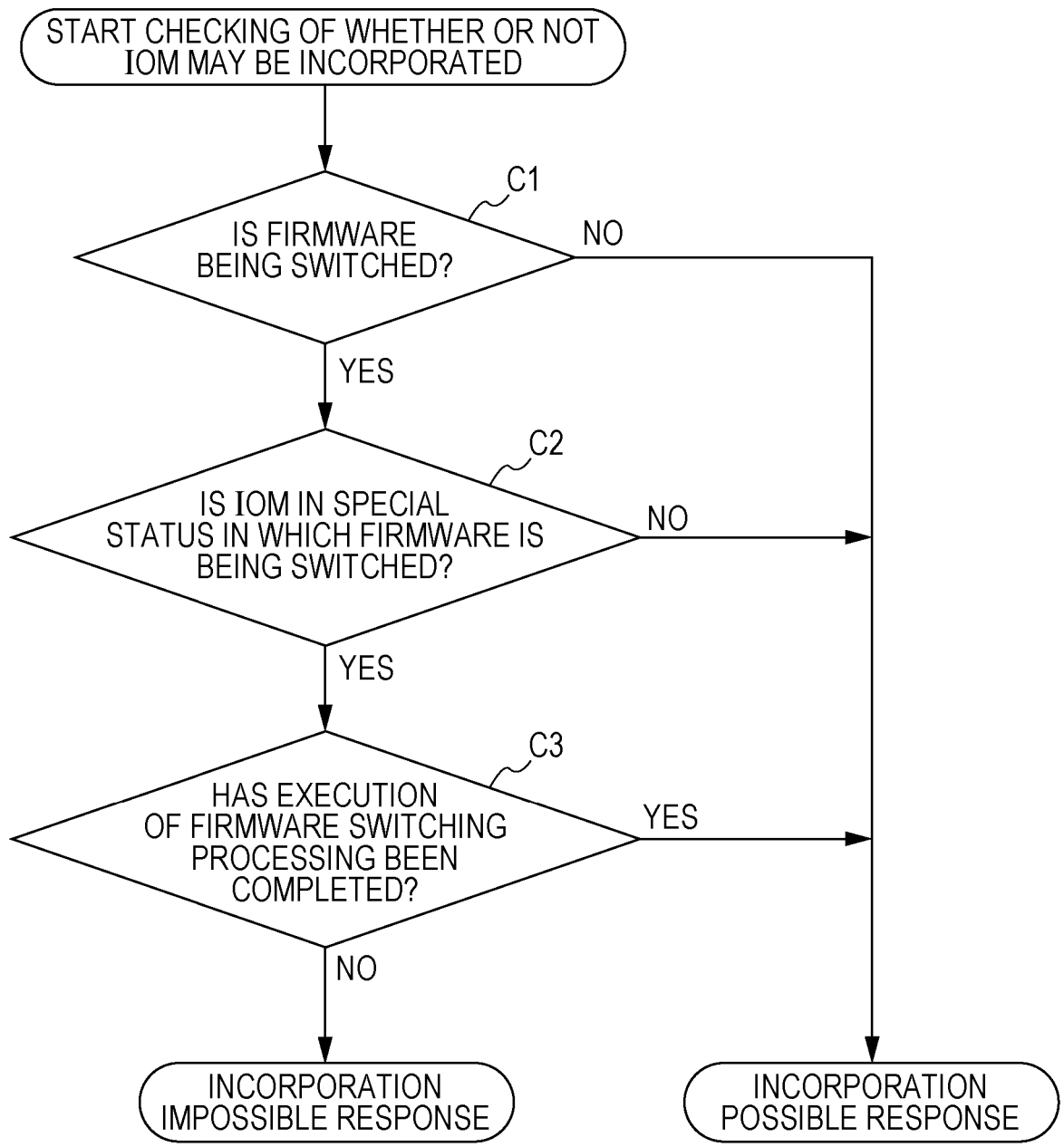
FIG. 11 is a flowchart illustrating a method for determining whether or not the IOM in the storage apparatus as an example of the embodiment may be incorporated.

Next, the method for determining whether or not the IOM 23 in the storage apparatus 1, as an example of the embodiment, may be incorporated will be described with reference to a flowchart (steps C1 to C3) illustrated in FIG. 11.

The maintenance control unit (firmware management unit) 107 refers to the firmware switching progress information 201 so as to confirm whether or not the IOM 23 which is a determination target is under switching of firmware.

In the case where the IOM 23 is not under switching of firmware as a result of the confirmation (see the NO route of step C1), it is determined that this IOM 23 may be incorporated and a response indicating that this IOM 23 may be incorporated is made.

In the case where the IOM 23 is under switching of firmware as a result of the confirmation in step C1 (see the YES route of step C1), the processing shifts to step C2.

In step C2, the maintenance control unit 107 confirms the status of the IOM 23, which is the determination target, in the firmware switching progress information 201 and confirms whether or not "CFL_BOOT" is set for this IOM 23. That is, the maintenance control unit 107 confirms whether or not a special status (CFL_BOOT) indicating that firmware is being switched is set for the IOM 23 which is the determination target. In the case where "CFL_BOOT" is not set for the IOM 23 as a result of the confirmation (see the NO route of step C2), it is determined that this IOM 23 may be incorporated and a response indicating that this IOM 23 may be incorporated is made.

On the other hand, in the case where "CFL_BOOT" is set for the IOM 23 as a result of the confirmation of step C2 (see the YES route of step C2), the processing shifts to step C3.

In step C3, the maintenance control unit 107 refers to the firmware switching progress information 201 and confirms whether or not the IOM 23 which is the determination target has completed the execution of the firmware switching processing, that is, whether or not reboot has been executed after rewriting of the firmware.

In the case where reboot has been executed as a result of the confirmation (see the YES route of step C3), it is determined that the execution of the firmware switching processing has been completed and this IOM 23 may be incorporated and a response indicating that this IOM 23 may be incorporated is made.

On the other hand, in the case where reboot has not been executed as a result of the confirmation in step C3 (see the NO route of step C3), it is determined that the firmware switching processing has not been performed and this IOM 23 may not be incorporated and a response indicating that this IOM 23 may not be incorporated is made.

(C) Effects

Thus, according to the storage apparatus 1 as an example of the embodiment, in the case where an abnormality occurs in one IOM 23 and this IOM 23 is degenerated in the active firmware application processing, the reset confirmation unit 121 confirms whether or not new firmware is applied to other IOMs 23 on the same system as that of the IOM 23 which is a firmware switching target.

Then, the update inhibition unit 122 inhibits incorporation of the IOM 23, firmware of which has not been switched to new firmware, into the system and maintains the status of this IOM 23 as CFL_BOOT.

Accordingly, access from the CM 10 to the IOM 23, firmware of which has not been switched to new firmware, does not occur, being able to avoid unintended degeneration of the IOM 23 to which the new firmware has not been applied. Concerning this IOM 23, when reset processing is subsequently performed, the new firmware is applied.

Further, in the processing for separating an abnormal IOM 23 during the active firmware application processing, an IOM 23 whose firmware switching has not been completed is distinguished, thereby being able to realize separation of only the abnormal IOM 23 and perform a stable device operation.

In the case where the version number confirmation unit 123 receives an error response from an IOM 23 with respect to a firmware switching command issued with respect to the IOM 23, the version number confirmation unit 123 confirms the firmware version number of this IOM 23.

In the case where the firmware of this IOM 23 has been switched to new firmware as a result of this confirmation, the device processing unit 124 executes reboot instruction so as to incorporate this IOM 23 into the storage apparatus 1. Accordingly, even in the case where an error response is issued from the IOM 23 in the active firmware application processing, it is possible to normally end the firmware application processing with respect to an error response which is made such that the IOM 23 is reset and new firmware which has been stored in a memory is normally applied.

(D) Others

The disclosed technique is not limited to the above-described embodiment, and various modifications may be made without departing from the gist of the present embodiment. Each configuration and each processing of this embodiment may be selected as appropriate or may be combined as appropriate.

For example, the hardware configuration of the storage apparatus 1 is not limited to the configuration illustrated in FIG. 1, and the hardware configuration may be implemented with appropriate modifications.

Figure 12:
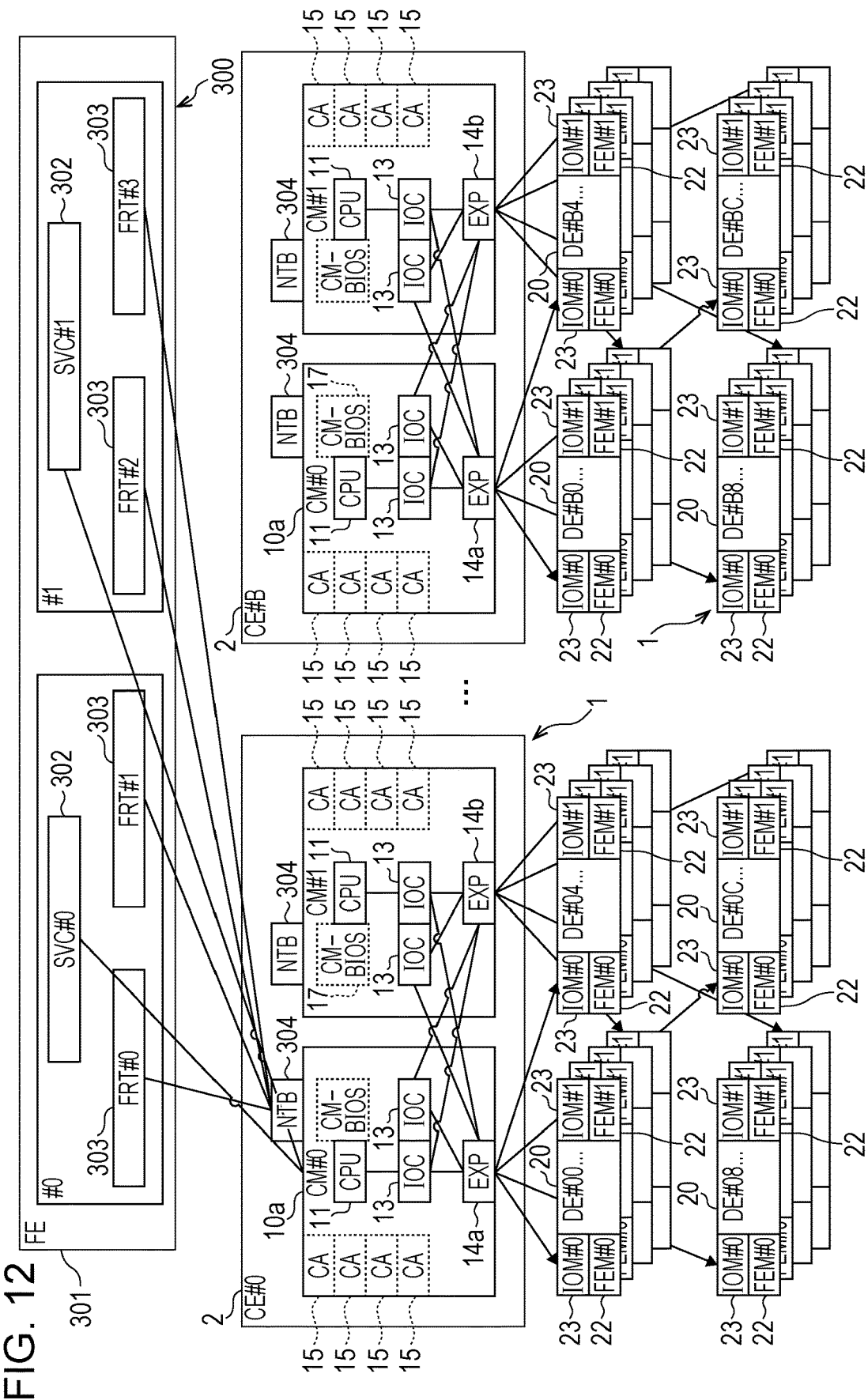
FIG. 12 is a diagram illustrating the configuration of a high-end storage system.
Figure 15:
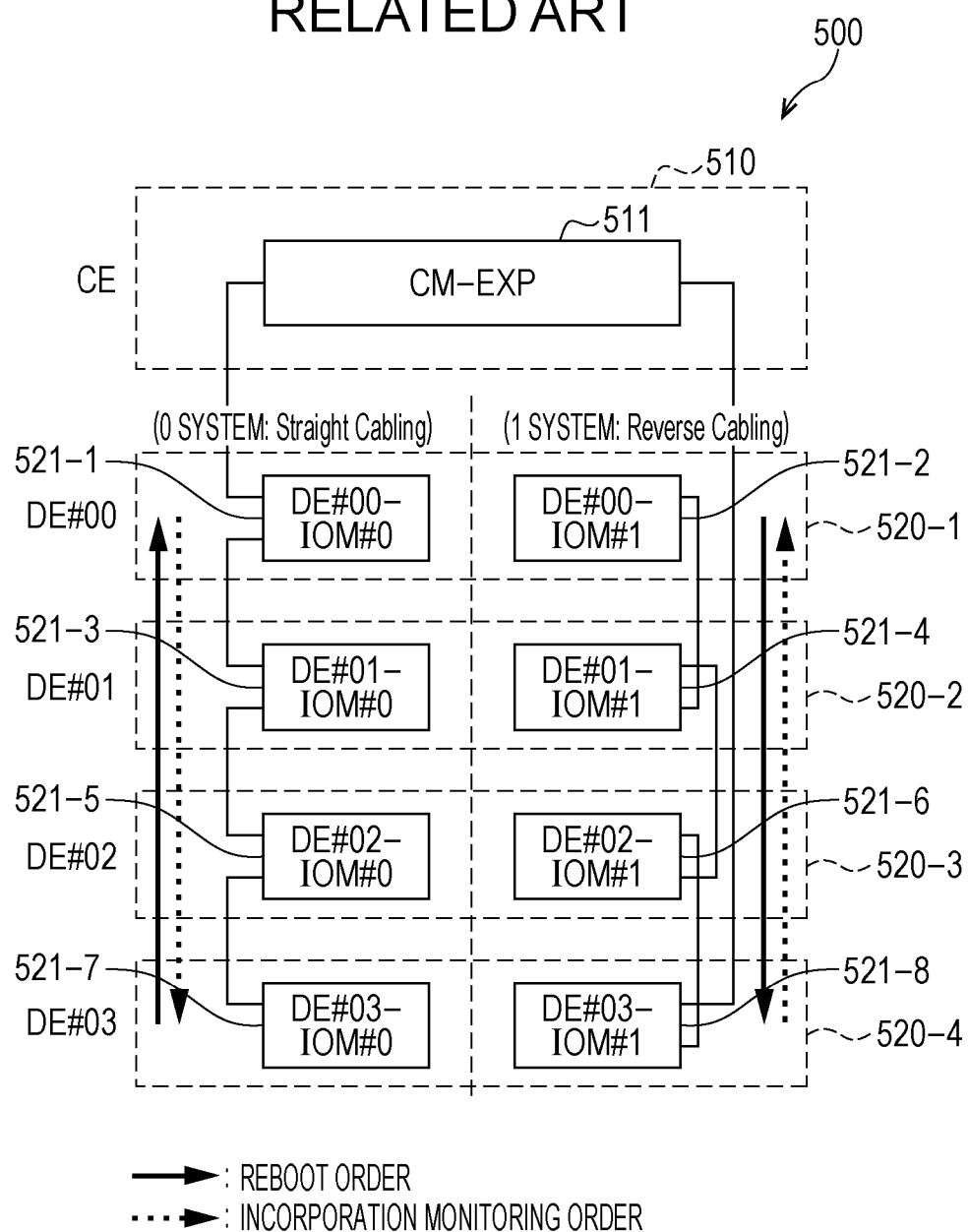
FIG. 15 is a diagram illustrating a procedure of switching firmware of an IOM in a storage system of related art.

That is, the hardware configuration is not limitedly applied to the storage apparatus 1 having the low-end or middle-range device configuration illustrated in FIG. 1, but may be applied to the storage apparatus 1 provided to a so-called high-end storage system 300 as illustrated in FIG. 12, for example.

The storage system 300 illustrated in FIG. 12 includes a front enclosure (FE) 301 and a plurality of (two in the example illustrated in FIG. 12) storage apparatuses 1. In FIG. 12, the same reference characters as the above-mentioned reference characters denote the same parts, so that the description thereof will be omitted. Also, in FIG. 12, illustration of a part of the configuration is omitted for the sake of convenience.

The FE 301 is a connection device for connecting a plurality of CMs 10 and includes two units (#0 and #1) in each of which one service controller (SVC) 302 and two front-end routers (FRTs) 303 are combined. In the FE 301, each of the SVC 302 and FRTs 303 is connected to each of the CMs 10a and 10b via a nontransparent bridge (NTB) 304.

Such configuration enables each of the CMs 10a and 10b to communicate with other CMs 10a and 10b via any of the FRTs 303. Thus, in the storage system 300, redundancy of the communication route between the CM 10a and the CM 10b is realized.

Further, it is possible for a person skilled in the art to practice and manufacture the present embodiment based on the above-described disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage apparatus comprising:
a plurality of electronic devices each including a first memory and a first processor;
a storage device;
a plurality of device housings in which the plurality of electronic devices and the storage device are mounted;
a storage control device including:
a second memory; and
a second processor coupled to the second memory, the second processor configured to:
during degeneration processing in which a first electronic device is degenerated based on an abnormality which has occurred in the first electronic device among the plurality of electronic devices after a new firmware used for switching of firmware of the electronic devices is stored in the first memories of the electronic devices, confirm whether switching to new firmware has been completed in a second electronic device among the plurality of electronic devices, the second electronic device being on a connection route coupling the first electronic device which is a firmware switching target and the storage control device, and
inhibit incorporation of the second electronic device as a usable device in a case where switching to the new firmware has not been completed in the second electronic device;
wherein the second processor is further configured to inhibit an incorporation request into the storage apparatus for the second electronic device in a case where switching to the new firmware has not been completed in the second electronic device.

2. The storage control device according to claim 1, wherein the second processor is further configured to confirm whether switching to the new firmware has been completed by referring to progress information, the progress information indicating a progress state of switching to the new firmware, for each of the plurality of electronic devices.

3. The storage control device according to claim 1, wherein the second processor is further configured to:
confirm a version of firmware applied to a third electronic device, the third electronic device being on the connection route coupling the first electronic device and the storage control device, among the plurality of electronic devices, and
incorporate the third electronic device as a usable device in a case where the firmware applied to the third electronic device is the new firmware.

4. A non-transitory, computer-readable recording medium having stored therein a program for causing a computer processor included in a storage control device mounted in a storage apparatus to execute a process, the process comprising:
confirming whether switching to new firmware has been completed in a second electronic device of a plurality of electronic devices mounted in the storage apparatus, the second electronic device being on a connection route coupling a first electronic device which is a firmware switching target and the storage control device, among the plurality of electronic devices; and
inhibiting incorporation of the second electronic device as a usable device in a case where switching to the new firmware has not been completed in the second electronic device, wherein
the confirming is performed and the inhibiting is performed during degeneration processing in which the first electronic device is degenerated based on an abnormality which has occurred in the first electronic device among the plurality of electronic devices after the new firmware used for switching of firmware of the electronic devices is stored in a storage unit of the electronic devices; and
wherein the inhibiting is executed in a case where the second electronic device is an incorporation target on connection and switching to the new firmware has not been completed in the second electronic device.

5. The non-transitory, computer-readable recording medium according to claim 4, wherein the confirming is performed by referring to progress information, the progress information indicating a progress state of switching to the new firmware, for each of the plurality of electronic devices.

6. The non-transitory, computer-readable recording medium according to claim 4, the process further comprising:

confirming a version of firmware applied to a third electronic device, the third electronic device being on the connection route connecting the first electronic device and the storage control device, among the plurality of electronic devices; and incorporating the third electronic device as a usable device in a case where the firmware applied to the third electronic device is the new firmware.

7. A method for switching firmware in a plurality of electronic devices in a storage apparatus, comprising:

changing a status of a first set of plurality of electronic devices to a firmware switching status, the first set includes at least two electronic devices coupling, on a first connection route, to a storage control device in the storage apparatus;

issuing a firmware switching command from the storage control device to the first set of electronic devices;

receiving an abnormality indication from one of the electronic devices in the first set in response to the firmware switching command;

determining whether a firmware in the one electronic device with the abnormality indication is a predetermined firmware version;

maintaining the firmware switching status of other electronic devices in the first set on the first connection route to enable firmware switching of the other electronic devices; and upon determining that the firmware in the one electronic device with the abnormality indication is not the predetermined firmware version, initiating a degeneration process to separate the one electronic device from the storage apparatus.

8. A method of claim 7, further comprising:

resetting the other electronic devices in the first set on the first connection route to complete firmware switching; and incorporating the other electronic devices in the first set on the first connection route as usable devices in the storage apparatus.

* * * * *